(12) United States Patent
Akai et al.

(10) Patent No.: US 12,037,436 B2
(45) Date of Patent: Jul. 16, 2024

(54) UNSATURATED POLYESTER RESIN COMPOSITION, MOLDING MATERIAL, MOLDED ARTICLE, AND BATTERY PACK HOUSING FOR ELECTRIC VEHICLES

(71) Applicant: JAPAN COMPOSITE CO., LTD., Tokyo (JP)

(72) Inventors: Ikuo Akai, Shizuoka (JP); Satoshi Tamura, Shizuoka (JP); Kenji Tsuboi, Shizuoka (JP); Masahiro Hakotani, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 830 days.

(21) Appl. No.: 17/045,891

(22) PCT Filed: Apr. 5, 2019

(86) PCT No.: PCT/JP2019/015145
§ 371 (c)(1),
(2) Date: Oct. 7, 2020

(87) PCT Pub. No.: WO2019/198641
PCT Pub. Date: Oct. 17, 2019

(65) Prior Publication Data
US 2021/0139629 A1  May 13, 2021

(30) Foreign Application Priority Data

Apr. 12, 2018 (JP) ................... 2018-076949

(51) Int. Cl.
*C08F 283/01* (2006.01)
*C08J 5/24* (2006.01)
(Continued)

(52) U.S. Cl.
CPC ............. *C08F 283/01* (2013.01); *C08J 5/244* (2021.05); *C08J 5/249* (2021.05); *C08K 3/22* (2013.01);
(Continued)

(58) Field of Classification Search
CPC . C08F 283/01; H01M 50/249; H01M 50/227; H01M 50/244; H01M 50/224;
(Continued)

(56) References Cited

U.S. PATENT DOCUMENTS 7,285,334 B1 * 10/2007 Yamashita .......... H01M 50/122
428/458
2002/0055030 A1 * 5/2002 Okumura ............... H01B 1/122
252/500

(Continued)

FOREIGN PATENT DOCUMENTS

| CN | 103524975 A | 1/2014 |
| JP | 10-95904 A | 4/1998 |

(Continued)

OTHER PUBLICATIONS

International Search Report (ISR) dated Jul. 2, 2019 filed on PCT/JP2019/015145.
(Continued)

*Primary Examiner* — Brian R Ohara
*Assistant Examiner* — Emily Elizabeth Freeman
(74) *Attorney, Agent, or Firm* — RANKIN, HILL & CLARK LLP (57) ABSTRACT

An unsaturated polyester resin composition includes aluminum hydroxide and a resin component containing an unsaturated polyester, a polymerizable monomer, and a low profile agent. The unsaturated polyester is a polymerized product of polybasic acid and polyhydric alcohol. The polybasic acid contains unsaturated polybasic acid, and the unsaturated
(Continued)

polybasic acid is blended in an amount of 80 mol % or more relative to 100 mol % the polybasic acid. The low profile agent contains polyvinyl acetate, and the polyvinyl acetate is blended in an amount of 3 parts by mass or more and 10 parts by mass or less relative to 100 parts by mass of the resin component. The aluminum hydroxide is blended in an amount of 150 parts by mass or more and 300 parts by mass or less relative to 100 parts by mass of the resin component.

10 Claims, 1 Drawing Sheet

(51) Int. Cl.
| | | |
|---|---|---|
| *C08K 3/22* | (2006.01) | |
| *C08K 3/32* | (2006.01) | |
| *C08K 7/06* | (2006.01) | |
| *C08K 7/14* | (2006.01) | |
| *H01M 50/224* | (2021.01) | |
| *H01M 50/227* | (2021.01) | |
| *H01M 50/244* | (2021.01) | |
| *H01M 50/249* | (2021.01) | |

(52) U.S. Cl.
CPC .................. *C08K 3/32* (2013.01); *C08K 7/06* (2013.01); *C08K 7/14* (2013.01); *H01M 50/224* (2021.01); *H01M 50/227* (2021.01); *H01M 50/244* (2021.01); *H01M 50/249* (2021.01); *C08K 2003/2227* (2013.01); *C08K 2003/323* (2013.01); *H01M 2220/20* (2013.01)

(58) Field of Classification Search
CPC ...... H01M 2220/20; C08J 5/249; C08J 5/244; C08K 3/22; C08K 3/32; C08K 7/06; C08K 7/14; C08K 2003/2227; C08K 2003/323

See application file for complete search history.

(56) References Cited

U.S. PATENT DOCUMENTS

| | | | |
|---|---|---|---|
| 2013/0071785 A1* | 3/2013 | Moroiwa | G03G 9/08755 525/440.08 |
| 2014/0332712 A1 | 11/2014 | Itami et al. | |
| 2021/0013460 A1* | 1/2021 | Ootsuki | B32B 27/285 |

FOREIGN PATENT DOCUMENTS

| | | |
|---|---|---|
| JP | 2007-177127 A | 7/2007 |
| JP | 2009-173813 A | 8/2009 |
| JP | 2009-209269 A | 9/2009 |
| JP | 2010-65150 A | 3/2010 |
| WO | 2013/089196 A1 | 6/2013 |
| WO | 2018/012205 A1 | 1/2018 |

OTHER PUBLICATIONS

PCT International Preliminary Report on Patentability (Form PCT/IB/373) filed in PCT/JP2019/015145, with PCT Notification Concerning Transmittal of International Preliminary Report on Patentability (Form PCT/IB/326) dated Oct. 22, 2020.

PCT International Preliminary Report on Patentability (Form PCT/IB/373) filed in PCT/JP2019/015145, with PCT Notification of Transmittal of Translation of the International Preliminary Report on Patentability (Form PCT/IB/338) dated Oct. 22, 2020.

* cited by examiner

UNSATURATED POLYESTER RESIN COMPOSITION, MOLDING MATERIAL, MOLDED ARTICLE, AND BATTERY PACK HOUSING FOR ELECTRIC VEHICLES

TECHNICAL FIELD

The present invention relates to an unsaturated polyester resin composition, molding material, molded article, and battery pack housing for electric vehicles. In particular, the present invention relates to an unsaturated polyester resin composition, a molding material containing the unsaturated polyester resin composition, a molded article containing a cured product of the molding material, and a battery pack housing for electric vehicles containing the cured product of the molding material.

BACKGROUND ART

Conventionally, molded articles containing a molding material (particularly, SMC (sheet molding compound)) containing unsaturated polyester resin are excellent in appearance, mechanical properties, water resistance, and anticorrosion, and therefore used partially in place of steel plates for automobiles.

Patent Document 1 proposed such a molding material of, for example, a molding material containing unsaturated polyester resin, low profile agent, calcium carbonate as a filler, and carbon fiber as a reinforced fiber (for example, see Patent Document 1 below).

To be more specific, a molded article composed of such a molding material is used mainly in those parts that are required to have rigidity and heat resistance, such as engine oil sump and rocker cover, other than trunk lids and bonnets, in combination with steel plates.

CITATION LIST

Patent Document

Patent Document 1: Japanese Unexamined Patent Publication No. 2009-209269

SUMMARY OF THE INVENTION

Problem to be Solved by the Invention

Recently, in view of lightweight, it is desired that such a molded article is used in combination with, other than steel plates, light metal.

However, the molded article composed of the molding material of Patent Document 1 has a linear expansion coefficient smaller than that of light metal, and therefore when such a molded article is combined with light metal, there are disadvantages in that dimensional stability is poor. Generally, plastic (thermoplastic resin) has a linear expansion coefficient of more than 50 ppm/° C., which is larger than that of metal, and it is not suitable for this use.

Furthermore, such a molded article may be required to have flame retardancy, for low shrinkage to reduce warping and deformation, and for delaying the fire spread at the time when the vehicle gets fire.

The present invention aims to provide an unsaturated polyester resin composition for producing a molded article with excellent low shrinkage and flame retardancy, and excellent dimensional stability even though combined with a light metal component; a molding material containing the unsaturated polyester resin composition, a molded article containing the cured product of the molding material, and a battery pack housing for electric vehicles containing the cured product of the molding material.

Means for Solving the Problem

The present invention [1] includes an unsaturated polyester resin composition containing an unsaturated polyester, a polymerizable monomer, a low profile agent, and aluminum hydroxide, wherein the unsaturated polyester is a polymerized product of polybasic acid and polyhydric alcohol, the polybasic acid contains the unsaturated polybasic acid, the unsaturated polybasic acid is blended in an amount of 80 mol % or more relative to 100 mol % of the polybasic acid, the low profile agent contains polyvinyl acetate, the polyvinyl acetate is blended in an amount of 3 parts by mass or more and 10 parts by mass or less relative to 100 parts by mass of a total amount of the unsaturated polyester, polymerizable monomer, and low profile agent, and the aluminum hydroxide is blended in an amount of 150 parts by mass or more and 300 parts by mass or less relative to 100 parts by mass of a total amount of the unsaturated polyester, polymerizable monomer, and low profile agent.

The present invention [2] includes the unsaturated polyester resin composition described in [1] above, wherein the low profile agent further contains a saturated polyester, and the saturated polyester is blended in an amount of 8 parts by mass or more and 15 parts by mass or less relative to 100 parts by mass of a total amount of the unsaturated polyester, polymerizable monomer, and low profile agent.

The present invention [3] includes the unsaturated polyester resin composition described in [1] or [2] above, substantially containing no halogen fire retardant.

The present invention [4] includes the unsaturated polyester resin composition described in any one of the above-described [1] to [3], further containing a phosphorus fire retardant.

The present invention [5] includes the unsaturated polyester resin composition described in any one of the above-described [1] to [4], further containing a hollow filler.

The present invention [6] includes a molding material including the unsaturated polyester resin composition described in the above-described [1] to [5], and reinforced fiber, wherein in the unsaturated polyester resin composition, a filler-excluding component is contained in total of 30 vol % or more and 50 vol % or less, the filler-excluding component being a component excluding the aluminum hydroxide and filler blended as necessary.

The present invention [7] includes a molded article containing the cured product of the molding material described in [6] above.

The present invention [8] includes the molded article described in [7] above having a linear expansion coefficient of more than 17 ppm/° C. and 25 ppm/° C. or less.

The present invention [9] includes the molded article described in [7] or [8] above, for use as a battery pack housing for electric vehicles.

The present invention [10] includes the battery pack housing for electric vehicles containing an aluminum member, and the molded article described in any one of the above-described [7] to [9] combined with the aluminum member.

Effects of the Invention

In the unsaturated polyester resin composition of the present invention, the polybasic acid of the unsaturated polyester contains a predetermined ratio of unsaturated polybasic acid.

In the unsaturated polyester resin composition of the present invention, polyvinyl acetate, i.e., a low profile agent, is at a predetermined ratio relative to a total amount of the unsaturated polyester, polymerizable monomer, and low profile agent.

Therefore, the molded article produced by using the unsaturated polyester resin composition has excellent low shrinkage and flame retardancy.

Furthermore, in the unsaturated polyester resin composition of the present invention, in addition, aluminum hydroxide is contained at a predetermined ratio relative to a total amount of the unsaturated polyester, polymerizable monomer, and low profile agent.

Therefore, the molded article produced by using the unsaturated polyester resin composition has excellent flame retardancy, and also excellent dimensional stability even combined with light metal.

The molding material of the present invention contains the unsaturated polyester resin composition of the present invention, and therefore the molded article produced by using the molding material has excellent low shrinkage, excellent flame retardancy, and excellent dimensional stability even combined with light metal.

The molded article of the present invention contains a cured product of the molding material of the present invention, and therefore has excellent low shrinkage, excellent flame retardancy, and excellent dimensional stability even combined with light metal.

The battery pack housing for electric vehicles of the present invention includes the molded article of the present invention, and therefore has excellent low shrinkage, excellent flame retardancy, and excellent dimensional stability even combined with light metal.

DESCRIPTION OF THE EMBODIMENTS

The unsaturated polyester resin composition of the present invention contains a resin component and aluminum hydroxide.

The resin component contains an unsaturated polyester, polymerizable monomer, and low profile agent.

The unsaturated polyester is a polymerized product of polybasic acid and polyhydric alcohol.

The polybasic acid contains unsaturated polybasic acid as an essential component and saturated polybasic acid as an optional component.

Examples of the unsaturated polybasic acid include aliphatic unsaturated dibasic acid such as maleic acid, fumaric acid, itaconic acid, aconitic acid, and dihydromuconic acid, halogenated product of these acids, and alkyl ester of these acids.

The unsaturated polybasic acid includes acid anhydride derived from the above-described aliphatic unsaturated dibasic acids, for example, maleic anhydride.

Examples of the unsaturated polybasic acid include, preferably, maleic anhydride and fumaric acid.

Examples of the saturated polybasic acid include aliphatic saturated polybasic acid, alicyclic saturated polybasic acid, aromatic saturated polybasic acid (ethylenic unsaturated double bond-noncontaining aromatic polybasic acid), halogenated product of these acids, and alkyl ester of these acids.

Examples of the aliphatic saturated polybasic acid include aliphatic saturated dibasic acids such as oxalic acid, malonic acid, succinic acid, methyl succinic acid, 2,2-dimethyl succinic acid, 2,3-dimethyl succinic acid, hexyl succinic acid, glutaric acid, 2-methyl glutaric acid, 3-methyl glutaric acid, 2,2-dimethyl glutaric acid, 3,3-dimethyl succinic acid, adipic acid, pimelic acid, suberic acid, azelaic acid, and sebacic acid.

Examples of the aliphatic saturated polybasic acid include acid anhydride derived from the above-described aliphatic saturated dibasic acid, for example, oxalic anhydride and succinic anhydride.

Examples of the alicyclic saturated polybasic acid include alicyclic saturated dibasic acids including HET acid, 1,2-hexahydrophthalic acid, 1,1-cyclobutane dicarboxylic acid, 1,4-cyclohexane dicarboxylic acid (cis- or trans-1,4-cyclohexane dicarboxylic acid or mixture thereof), and dimer acid.

Examples of the aromatic saturated polybasic acid include aromatic saturated dibasic acids such as phthalic acid (orthophthalic acid, isophthalic acid, terephthalic acid), trimellitic acid, and pyromellitic acid.

Examples of the aromatic saturated polybasic acid include acid anhydride derived from the above-described aromatic saturated dibasic acid, for example, phthalic anhydride.

Examples of the saturated polybasic acid include, preferably, aromatic saturated polybasic acid, more preferably, aromatic saturated dibasic acid, even more preferably, phthalic acid, and particularly preferably, isophthalic acid is used.

The polybasic acid can be used singly, or can be used in combination of two or more.

In the unsaturated polyester, polybasic acid contains a predetermined ratio of unsaturated polybasic acid.

To be specific, when the unsaturated polybasic acid and saturated polybasic acid are used in combination, unsaturated polybasic acid is blended in an amount of 80 mol % or more, and for example, 99 mol % or less relative to polybasic acid.

When the unsaturated polybasic acid is used singly, unsaturated polybasic acid is blended in an amount of 100 mol % (that is, 80 mol % or more) relative to polybasic acid.

Preferably, unsaturated polybasic acid is used singly.

In the unsaturated polyester, the polybasic acid has the unsaturated polybasic acid in the above-described range, and therefore such unsaturated polyester has high reactivity.

Examples of the polyhydric alcohol include dihydric alcohols such as alkane diols such as ethylene glycol, propylene glycol (1,2- or 1,3-propanediol or mixture thereof), butylene glycol (1,2- or 1,3- or 1,4-butylene glycol or mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentane diol, and 3,3-dimethylolheptane; aliphatic diols such as ether diol including diethylene glycol, triethylene glycol, and dipropylene glycol; alicyclic diols such as cyclohexanediol (1,2- or 1,3- or 1,4-cyclohexanediol or mixture thereof), cyclohexane dimethanol (1,2- or 1,3- or 1,4-cyclohexanedimethanol or mixture thereof), cyclohexane diethanol (1,2- or 1,3- or 1,4-cyclohexane diethanol or mixture thereof), and hydrogenated bisphenol A, and aromatic diols including bisphenol A, ethylene oxide adduct of bisphenol A, and propylene oxide adduct of bisphenol A; trihydric alcohols such as glycerine, trimethylolpropane, and triisopropanol amine; tetrahydric alcohols such as tetramethylol methane (pentaerythritol) and diglycerol; pentahydric alcohols such as xylitol; hexahydric alcohols such as sorbitol, mannitol, allitol, iditol, dulcitol, altritol, inositol, and dipentaerythritol, and preferably, dihydric alcohol, more preferably, aliphatic diol, even more preferably, alkane diol, particularly preferably, propylene glycol and neopentyl glycol are used.

Polyhydric alcohol can be used singly, or can be used in combination of two or more, and preferably, propylene glycol and neopentyl glycol are used in combination.

Unsaturated polyester can be produced by condensation polymerization of polybasic acid and polyhydric alcohol.

To conduct condensation polymerization of polybasic acid and polyhydric alcohol (condensation polymerization), polybasic acid is blended with polyhydric alcohol so that the equivalent ratio thereof (hydroxyl group of polyhydric alcohol/carboxyl group of polybasic acid) is, for example, 0.9 or more, preferably 0.95 or more, and for example, 1.2 or less, preferably 1.1 or less, and the mixture is stirred under normal pressure in a nitrogen atmosphere.

Examples of the reaction temperature include 150° C. or more, preferably 190° C. or more, and for example, 250° C. or less, preferably 230° C. or less.

Examples of the reaction time include, 8 hours or more, and for example, 30 hours or less.

In the above-described reaction, as necessary, a known solvent and a known catalyst can also be blended.

In this manner, unsaturated polyester is produced.

Unsaturated polyester has an acid value (measurement method: in accordance with JIS K6901 (2008)) of, for example, 20 mgKOH/g or more, and less than 40 mgKOH/g.

The unsaturated polyester has a weight-average molecular weight of, for example, 6000 or more, preferably 8000 or more, and for example, 25000 or less, preferably 20000 or less.

The weight-average molecular weight is polystyrene-based weight-average molecular weight by GPC (Gel Permeation Chromatography), and can be determined by GPC analysis on unsaturated polyester.

The unsaturated polyester is blended in an amount of, relative to the resin component, for example, 20 mass % or more, and for example, 60 mass % or less.

The polymerizable monomer is a solvent for dissolving the unsaturated polyester, and at the time of curing unsaturated polyester resin (described later), it is a crosslinkable monomer (reactive diluent) that can crosslink with the unsaturated polyester, and for example, the following can be used: styrene monomers such as styrene, α-methyl styrene, α-ethyl styrene, vinyl toluene, t-butyl styrene, and chloro styrene; alkyl (meth)acrylates such as methyl (meth)acrylate, ethyl (meth)acrylate, isopropyl (meth)acrylate, butyl (meth)acrylate, n-butyl (meth)acrylate, t-butyl (meth)acrylate, isobutyl (meth)acrylate, 2-ethyl hexyl (meth)acrylate, lauryl (meth)acrylate, tri decyl (meth)acrylate, and stearyl (meth)acrylate; (meth)acrylic acid allyl esters such as (meth)acrylic acid allyl; cyclic-structure-containing (meth)acrylates such as (meth)acrylic acid cyclohexyl, (meth)acrylic acid benzyl, (meth)acrylic acid isobornyl, (meth)acrylic acid glycidyl, (meth)acrylic acid tetra hydro furfuryl, (meth)acrylic acid dicyclo pentenyl, (meth)acrylic acid dicyclo pentenyl, and (meth)acrylic acid dicyclo pentenyl oxy ethyl; (meth)acrylic acid hydroxy alkyl esters such as (meth)acrylic acid 2-hydroxy ethyl and (meth)acrylic acid 2-hydroxy propyl; (meth)acrylic acid alkoxy alkyl esters such as 2-methoxy ethyl (meth)acrylate and 2-ethoxy ethyl (meth)acrylate; (meth)acrylic acid amino alkyl ester such as (meth)acrylic acid dimethyl amino ethyl and (meth)acrylic acid diethyl amino ethyl and their chloride salts; (meth)acrylate monomers such as (meth)acrylic acid fluoro alkyl ester including (meth)acrylic acid tri fluoro ethyl and (meth)acrylic acid hepta decafluo decyl; polyfunctional (meth)acrylates such as ethylene glycol di(meth)acrylate, di ethylene glycol di(meth)acrylate, trimethylolpropane tri(meth)acrylate, pentaerythritol tetra(meth)acrylate, and di pentaerythritol hexa(meth)acrylate; and allyl monomers such as glycerine monoallyl ether, pentaerythritol diallyl ether, pentaerythritol monoallyl ether, and trimethylolpropane monoallyl ether. Preferably, styrene monomer, more preferably, styrene is used. (Meth)acryl means methacryl and/or acryl.

The polymerizable monomer can be used singly, or can be used in combination of two or more.

The polymerizable monomer is blended in an amount of, relative to the resin component, for example, 30 mass % or more, and for example, 70 parts by mass % or less, preferably 60 parts by mass % or less.

The mixing ratio of the polymerizable monomer relative to 100 parts by mass of the unsaturated polyester is, for example, 50 parts by mass or more, and for example, 220 parts by mass or less, preferably 150 parts by mass or less.

The low profile agent is blended so as to suppress cure shrinkage and thermal shrinkage of the molded article (described later), when the molded article (described later) is produced by using the unsaturated polyester resin composition.

The low profile agent contains, as an essential component, polyvinyl acetate.

Polyvinyl acetate suppresses cure shrinkage and thermal shrinkage of the molded article (described later).

Therefore, when the low profile agent contains polyvinyl acetate, the molded article (described later) produced by using the unsaturated polyester resin composition has excellent low shrinkage.

The mixing ratio of the polyvinyl acetate relative to 100 parts by mass of the resin component is, 3 parts by mass or more, preferably 5 parts by mass or more, and 10 parts by mass or less.

When the mixing ratio of the polyvinyl acetate is the above-described lower limit or more, the molded article (described later) produced by using the unsaturated polyester resin composition has excellent low shrinkage.

Meanwhile, when the mixing ratio of the polyvinyl acetate is less than the above-described lower limit, the molded article (described later) produced by using the unsaturated polyester resin composition has reduced low shrinkage.

When the mixing ratio of the polyvinyl acetate is the above-described upper limit or less, the molded article (described later) produced by using the unsaturated polyester resin composition has excellent low shrinkage.

Meanwhile, when the mixing ratio of the polyvinyl acetate is more than the above-described upper limit, film releasability at the time of molding material production gets worse to reduce production stability, and in the molded article (described later) produced by using the unsaturated polyester resin composition, flexural modulus at 90° C. and specific rigidity are reduced.

The low profile agent also contains, as optional components, other low profile agents such as, for example, polystyrene, polyethylene, crosslinking polystyrene, polyvinyl acetate-polystyrene block copolymer, SBS (rubber), and saturated polyester resin.

The saturated polyester resin is produced by dissolving the saturated polyester in the above-described polymerizable monomer.

The saturated polyester is a polymerized product of the above-described saturated polybasic acid and the above-described polyhydric alcohol.

Examples of the saturated polybasic acid include, preferably, aliphatic saturated polybasic acid, more preferably, aliphatic saturated dibasic acid, and even more preferably, adipic acid is used.

The saturated polybasic acid can be used singly, or can be used in combination of two or more.

Examples of the polyhydric alcohol include, preferably dihydric alcohol, more preferably, propylene glycol, ethylene glycol, diethylene glycol, 1,6hexanediol, and neopentyl glycol.

Polyhydric alcohol can be used singly, or can be used in combination of two or more.

The saturated polyester can be produced by condensation polymerization of the saturated polybasic acid and polyhydric alcohol.

To conduct condensation polymerization of the saturated polybasic acid and polyhydric alcohol, polybasic acid is blended with polyhydric alcohol so that the equivalent ratio of polyhydric alcohol relative to polybasic acid (hydroxyl group of polyhydric alcohol/carboxyl group of polybasic acid) is, for example, 0.9 or more, preferably 0.95 or more, and for example, 1.2 or less, preferably 1.1 or less, and the mixture is stirred under normal pressure in a nitrogen atmosphere.

Examples of the reaction temperature include 150° C. or more, preferably 190° C. or more, and for example, 250° C. or less, preferably 230° C. or less.

Examples of the reaction time include 8 hours or more, and for example, 30 hours or less.

In the above-described reaction, as necessary, a known solvent and a known catalyst can also be blended.

In this manner, the saturated polyester is produced.

The saturated polyester has an acid value (measurement method: in accordance with JIS K6901 (2008)) of, for example, 5 mgKOH/g or more and less than 40 mgKOH/g.

Then, the saturated polyester s dissolved in the above-described polymerizable monomer (preferably, styrene), and as necessary, an additive (polymerization inhibitor (described later) (preferably, hydroquinone)) is added to prepare the saturated polyester resin.

In preparation of the saturated polyester resin, the mixing ratio of the polymerizable monomer relative to 100 parts by mass of the saturated polyester is, for example, 35 parts by mass or more, and 150 parts by mass or less, and for example, the mixing ratio of the polymerization inhibitor relative to 100 parts by mass of the saturated polyester is, for example, 0.001 parts by mass or more, preferably 0.005 parts by mass or more, and for example, 0.1 parts by mass or less, preferably 0.05 parts by mass or less.

The low profile agent can be used singly, or can be used in combination of two or more, and preferably, polyvinyl acetate and the saturated polyester resin are used in combination.

That is, the low profile agent preferably includes saturated polyester resin.

When polyvinyl acetate and the saturated polyester resin are used in combination, the mixing ratio of the saturated polyester resin relative to 100 parts by mass of the resin component is, for example, 8 parts by mass or more, preferably 10 parts by mass or more, and for example, 15 parts by mass or less.

When the mixing ratio of the saturated polyester is the above-described lower limit or more, the molded article (described later) produced by using the unsaturated polyester resin composition has excellent low shrinkage.

When the mixing ratio of the saturated polyester is the above-described upper limit or less, the molded article (described later) produced by using the unsaturated polyester resin composition has excellent flame retardancy.

The resin component contains, as necessary, other no resin (excluding unsaturated polyester resin).

Examples of the other thermosetting resin include vinyl ester resin, brominated vinyl ester resin, and Acrysirup.

Vinyl ester resin is produced by dissolving vinyl ester in the above-described polymerizable monomer.

Vinyl ester is a reaction product of non-brominated epoxy resin and unsaturated monobasic acid.

The non-brominated epoxy resin is a reaction product of the first phenol component and the first epoxy component.

The first phenol component contains a non-brominated bisphenol compound.

The non-brominated bisphenol compound is represented by general formula (1) below.

[Chem 1]

(where Y1 represents one of —C(CH$_3$)$_2$—, —CH$_2$—, —O—, —S—, —(O=S=O)—)

Examples of the non-brominated bisphenol compound include bisphenol A, bisphenol F, and bisphenol S, and preferably, bisphenol A is used.

These non-brominated bisphenol compounds may be used singly or in combination of two or more.

The first epoxy component contains a non-brominated epoxy compound.

The non-brominated epoxy compound is represented by general formula (2) below.

[Chem 2]

(where Y1 is the same as Y1 in the above-described formula (1), n represents an integer of 0 to 5)

For the non-brominated epoxy compound, for example, bisphenol A epoxy resin, bisphenol F epoxy resin, and bisphenol S epoxy resin are used.

The non-brominated epoxy compound has an epoxy equivalent of, for example, 100 g/eq or more, preferably 150 g/eq or more, and for example, 800 g/eq or less, preferably 400 g/eq or less, more preferably less than 300 g/eq, even more preferably 250 g/eq or less.

These non-brominated epoxy compounds may be used singly or in combination of two or more.

To produce the non-brominated epoxy resin, the first phenol component is allowed to react with the first epoxy component. To be specific, the non-brominated bisphenol compound and non-brominated epoxy compound are blended, and the mixture is allowed to react.

In the above-described reaction, the non-brominated bisphenol compound and non-brominated epoxy compound go through chain extension reaction.

In the above-described reaction, the first epoxy component relative to 1 equivalent of the first phenol component is 0.5 equivalent or more, preferably 1.0 equivalent or more, preferably 2.0 equivalent or more, and for example, 4.0 equivalent or less.

In the above-described reaction, as necessary, a catalyst can be added.

Examples of the catalyst include amines such as triethyl amine and benzyl dimethyl amine; quaternary ammonium salts such as tetramethyl ammonium chloride and triethyl benzyl ammonium chloride; imidazoles such as 2-ethyl-4-imidazole; amides; pyridines; phosphines such as triphenylphosphine; phosphonium salts such as tetraphenyl phosphonium bromide and ethyl triphenyl phosphonium bromide; sulfonium salts; sulfonic acids; organic metal salts such as octylic acid zinc; and preferably, quaternary ammonium salt, more preferably, triethyl benzyl ammonium chloride is used.

These catalysts may be used singly or in combination of two or more.

The catalyst is blended in an amount of, relative to 100 parts by mass of a total amount of the first phenol component and first epoxy component, for example, 0.01 parts by mass or more, preferably 0.1 parts by mass or more, and for example, 3.0 parts by mass or less, preferably 1.0 part by mass or less.

In the above-described reaction, as necessary, a polymerization inhibitor (described later) (preferably, hydroquinone)) can be added.

The polymerization inhibitor is blended in an amount of, relative to 100 parts by mass of a total amount of the first phenol component and first epoxy component, for example, 0.001 parts by mass or more, preferably 0.005 parts by mass or more, and for example, 0.5 parts by mass or less, preferably 0.1 parts by mass or less.

The reaction conditions are as follows: the reaction temperature is, for example, 80° C. or more, preferably 100° C. or more, and for example, 170° C. or less, and reaction time is, 1 hour or more, preferably 3 hours or more, and for example, 12 hours or less, preferably 10 hours or less.

In this manner, non-brominated epoxy resin is produced.

The non-brominated epoxy resin has an epoxy equivalent of, for example, 200 g/eq or more, preferably 300 g/eq or more, and for example, 800 g/eq or less, preferably 400 g/eq or less.

Examples of the unsaturated monobasic acid include monocarboxylic acids such as (meth)acrylic acid, crotonic acid, cinnamic acid, and sorbic acid; and a reaction product of diprotic acid anhydride and alcohol having at least one unsaturated group in its molecule. Examples of the diprotic acid anhydride include maleic anhydride, succinic anhydride, phthalic anhydride, tetra hydrophthalic anhydride, and hexa hydrophthalic anhydride. Examples of the alcohol having an unsaturated group include hydroxy ethyl (meth)acrylate, hydroxy propyl (meth)acrylate, hydroxy butyl (meth)acrylate, pentaerythritol tri (meth)acrylate, and glycerine di (meth)acrylate.

Unsaturated monobasic acid can be used singly, or can be used in combination of two or more.

For the unsaturated monobasic acid, preferably, monocarboxylic acid, more preferably, (meth)acrylic acid, even more preferably, methacrylic acid is used.

To produce the vinyl ester, non-brominated epoxy resin is allowed to react with unsaturated monobasic acid.

In the above-described reaction, the epoxy group of non-brominated epoxy resin and the unsaturated monobasic acid go through addition reaction.

In the above-described reaction, the equivalent of the carboxyl group of the unsaturated monobasic acid relative to epoxy group of non-brominated epoxy resin is, for example, 1 or more, preferably 1.5 or more, and for example, 2.5 or less.

The reaction conditions are as follows: the reaction temperature is, for example, 80° C. or more, preferably 100° C. or more, and for example, 150° C. or less, preferably 130° C. or less, and reaction time is, 1 hour or more, preferably 2 hours or more, and for example, 10 hours or less.

The above-described reaction can also be conducted following the reaction between the above described first phenol component and first epoxy component.

In this manner, vinyl ester is produced.

Vinyl ester has an acid value (measurement method: in accordance with JIS K6901 (2008)) of, for example, 5 mgKOH/g or more, and 20 mgKOH/g or less.

Then, vinyl ester is dissolved in the above-described polymerizable monomer (preferably, styrene) to prepare vinyl ester resin.

Brominated vinyl ester resin is produced by dissolving brominated vinyl ester in the above-described polymerizable monomer.

Brominated vinyl ester resin is a reaction product of brominated epoxy resin and the above-described unsaturated monobasic acid.

Brominated epoxy resin is a reaction product of the second phenol component and second epoxy component.

The second phenol component contains brominated bisphenol compound.

The brominated bisphenol compound is represented by general formula (3) below.

[Chem 3]

(3)

(where Y1 is the same as Y1 in the above-described formula (1), a and b independently represent an integer of 1 to 4)

For the brominated bisphenol compound, for example, tetra bronco bisphenol A ([2,2-bis(3,5-dibromo-4-hydroxy phenyl) propane), dibromo bisphenol A, tetra bromo bisphenol F, and tetra bromo bisphenol S are used.

These brominated bisphenol compounds may be used singly or in combination of two or more.

The second phenol component contains, as necessary, the above-described non-brominated bisphenol compound.

The second epoxy component contains a brominated epoxy compound.

The brominated epoxy compound is represented by general formula (4) below.

[Chem 4]

(4)

(where Y1 is the same as Y1 in the above-described formula (1), c to f independently represent an integer of 1 to 4, n represents an integer of 0 to 5)

For the brominated epoxy compound, for example, tetra bromo bisphenol A epoxy resin, dibromo bisphenol A epoxy resin, tetra bromo bisphenol F epoxy resin, and tetra bromo bisphenol S epoxy resin are used.

The brominated epoxy compound has an epoxy equivalent of, for example, 100 g/eq or more, preferably 200 g/eq or more, more preferably 300 g/eq or more, and for example, 1000 g/eq or less, preferably 600 g/eq or less.

These brominated epoxy compounds may be used singly or in combination of two or more.

The second epoxy component contains, as necessary, the above-described non-brominated epoxy compound.

To produce brominated epoxy resin, the second phenol component is allowed to react with the second epoxy component. To be specific, the brominated bisphenol compound and brominated epoxy compound, non-brominated bisphenol compound blended as necessary, and non-brominated epoxy compound blended as necessary are blended, and the mixture is allowed to react.

In the above-described reaction, the brominated bisphenol compound, brominated epoxy compound, non-brominated bisphenol compound blended as necessary, and non-brominated epoxy compound blended as necessary go through chain extension reaction.

In the above-described reaction, the second epoxy component relative to 1 equivalent of the second phenol component is 0.5 equivalent or more, preferably 1.0 equivalent or more, preferably 2.0 equivalent or more, and for example, 4.0 equivalent or less.

In the above-described reaction, as necessary, the above-described catalyst can be added.

For the catalyst, preferably, quaternary ammonium salt, more preferably, triethyl benzyl ammonium chloride is used.

The catalyst is blended in an amount of, relative to 100 parts by mass of a total amount of the second phenol component and second epoxy component, for example, 0.01 parts by mass or more, preferably 0.1 parts by mass or more, and for example, 3.0 parts by mass or less, preferably 1.0 part by mass or less.

In the above-described reaction, as necessary, polymerization inhibitor (described later) (preferably, hydroquinone)) can be added.

The polymerization inhibitor is blended in an amount of, relative to 100 parts by mass of a total amount of the second phenol component and second epoxy component, for example, 0.001 parts by mass or more, preferably 0.005 parts by mass or more, and for example, 0.5 parts by mass or less, preferably 0.1 parts by mass or less.

The reaction conditions are as follows: the reaction temperature is, for example, 80° C. or more, preferably 100° C. or more, and for example, 150° C. or less, preferably 130° C. or less, and the reaction time is, for example, 1 hour or more, preferably 3 hours or more, and for example, 12 hours or less, preferably 10 hours or less.

In this manner, brominated epoxy resin is produced.

Brominated epoxy resin has an epoxy equivalent of, for example, 200 g/eq or more, preferably 300 g/eq or more, and for example, 800 g/eq or less, preferably 500 g/eq or less.

Brominated epoxy resin has a bromine content of, for example, 20 mass % or more, preferably 30 mass % or more, and for example, 60 mass % or less.

The bromine content of brominated epoxy resin can be determined by ion chromatography.

To produce the brominated vinyl ester, brominated epoxy resin is allowed to react with the above-described unsaturated monobasic acid (preferably, methacrylic acid).

In the above-described reaction, the epoxy group of brominated epoxy resin and unsaturated monobasic acid go through addition reaction.

In the above-described reaction, the equivalent of the carboxyl group of unsaturated monobasic acid relative to the epoxy group of brominated epoxy resin is, for example, 0.5 or more, preferably 1.0 or more, and for example, 2.5 or less.

The reaction conditions are as follows: the reaction temperature is, for example, 80° C. or more, preferably 100° C. or more, and for example, 150° C. or less, preferably 130° C. or less, and the reaction time is, for example, 1 hour or more, preferably 2 hours or more, and for example, 10 hours or less, preferably 6 hours or less.

The above-described reaction can be conducted following the reaction between the above-described second phenol component and second epoxy component.

In this manner, brominated vinyl ester is produced.

Brominated vinyl ester has an acid value (measurement method: in accordance with JIS K6901 (2008)) of, for example, 5 mgKOH/g or more, and 20 mgKOH/g or less.

Then, by dissolving brominated vinyl ester n the above-described polymerizable monomer (preferably, styrene), brominated vinyl ester resin is prepared.

Brominated vinyl ester resin has a bromine content of, for example, 10 mass % or more, preferably 20 mass % or more, and for example, 40 mass % or less.

The bromine content of brominated vinyl ester resin can be determined by ion chromatography.

The other thermosetting resin is blended in an amount of, relative to the resin component, for example, 15 mass % or more, and for example, 40 mass % or less.

Aluminum hydroxide is blended to give flame retardancy, and also give transparency and color scales (shades) to the molded article (described later) produced by using the unsaturated polyester resin composition.

Aluminum hydroxide has an average particle size of, for example, 1 μm or more, and for example, 50 μm or less, preferably 25 μm or less.

The average particle size of aluminum hydroxide can be determined by creating a particle size distribution curve by laser diffraction scattering particle size distribution analyzer, and calculating the particle size corresponding to 50 mass %.

Aluminum hydroxide can be used singly, or aluminum hydroxide with different average particle sizes, and aluminum hydroxide with different sodium oxide contents can be used in combination of two or more.

The mixing ratio of the aluminum hydroxide relative to 100 parts by mass of the resin component is, 150 parts by mass or more, preferably 160 parts by mass or more, and 300 parts by mass or less, more preferably 250 parts by mass or less.

When the mixing ratio of the aluminum hydroxide is the above-described lower limit or more, the molded article (described later) produced by using the unsaturated polyester resin composition has excellent flame retardancy.

Meanwhile, when the mixing ratio of the aluminum hydroxide is less than the above-described lower limit, flame retardancy is reduced in the molded article (described later) produced by using the unsaturated polyester resin composition.

When the mixing ratio of the aluminum hydroxide is the above-described upper limit or less, the molded article (described later) produced by using the unsaturated polyester resin composition has excellent dimensional stability even combined with light metal.

Meanwhile, when the mixing ratio of the aluminum hydroxide is more than the above-described upper limit, the molded article (described later) produced by using the unsaturated polyester resin composition combined with light metal has reduced dimensional stability. Also, at the time of production of molding material, the unsaturated polyester resin composition has excessively high viscosity, and impregnation properties relative to reinforced fiber (described later) are reduced.

That is, when the mixing ratio of the aluminum hydroxide is more than the above-described upper limit, flame retardancy can be improved but dimensional stability and production stability are reduced, and meanwhile, when it is less than the above-described lower limit, dimensional stability can be improved, but flame retardancy is reduced.

That is, the molded article (described later) produced by using the unsaturated polyester resin composition contains aluminum hydroxide at the above-described predetermined ratio, and therefore both flame retardancy and dimensional stability are excellent.

The unsaturated polyester resin composition can be produced by blending the resin component and aluminum hydroxide at the above-described mixing ratio. To be specific, it can be produced by blending unsaturated polyester, polymerizable monomer, low profile agent, and other thermosetting resin blended as necessary, and aluminum hydroxide at the above-described mixing ratio.

In this manner, the unsaturated polyester resin composition is produced.

To the unsaturated polyester resin composition, as necessary, additives such as a polymerization inhibitor, curing agent, release agent, coloring agent, filler, and thickening agent can be blended. These additives can be used singly, or can be used in combination of two or more.

The polymerization inhibitor is blended to adjust pot life and curing reaction, and examples thereof include hydroquinone compounds such as hydroquinone, methyl hydroquinone, and t-butyl hydroquinone; benzoquinone compounds such as p-benzoquinone and methyl-p-benzoquinone; catechol compounds such as t-butyl catechol; phenol compounds such as 2,6-di-t-butyl-4-methyl phenol and 4-methoxy phenol; and N-oxyl compounds such as 1-oxyl-2,2,6,6-tetramethyl piperidine, 1-oxyl-2,2,6,6-tetramethyl piperidine-4-ol, 4-hydroxy-2,2,6,6-tetra piperidine-1-oxyl, 4-methoxy-2,2,6,6-tetramethyl piperidine-1-oxyl, 1-oxyl-2,2,6,6-tetramethyl piperidine-4-yl-acetate, 1-oxyl-2,2,6,6-tetramethyl piperidine-4-yl-2-ethyl hexanoate, 1-oxyl-2,2,6,6-tetramethyl piperidine-4-yl-stearate, 1-oxyl-2,2,6,6-tetramethyl piperidine-4-yl-4-t-butyl benzoate, bis(1-oxyl-2,2,6,6-tetramethyl piperidine-4-yl) succinic acid ester, bis(1-oxyl-2,2,6,6-tetramethyl piperidine-4-yl) adipic acid ester, bis(1-oxyl-2,2,6,6-tetramethyl piperidine-4-yl) sebacate, bis(1-oxyl-2,2,6,6-tetramethyl piperidine-4-yl) n-butyl malonic acid ester, bis(1-oxyl-2,2,6,6-tetramethyl piperidine-4-yl) phthalate, bis(1-oxyl-2,2,6,6-tetramethyl piperidine-4-yl) isophthalate, bis(1-oxyl-2,2,6,6-tetramethyl piperidine-4-yl) terephthalate, bis(1-oxyl-2,2,6,6-tetramethyl piperidine-4-yl) hexa hydro terephthalate, N,N'-bis(1-oxyl-2,2,6,6-tetramethyl piperidine-4-yl) adipamide, N-bis(1-oxyl-2,2,6,6-tetramethyl piperidine-4-yl) caprolactam, N-bis(1-oxyl-2,2,6,6-tetramethyl piperidine-4-yl) dodecyl succinimide, 2,4,6-tris-[N-butyl-N-(1-oxyl-2,2,6,6-tetramethyl piperidine-4-yl)]-s-triazine, 1-oxyl-2,2,6,6-tetramethyl piperidine-4-one, and preferably, a benzoquinone compound, more preferably, p-benzoquinone is used.

The mixing ratio of the polymerization inhibitor relative to 100 parts by mass of the resin component is, for example, 0.01 parts by mass or more, and for example, 0.1 parts by mass or less.

The polymerization inhibitor can be used singly, or can be used in combination of two or more.

Examples of the curing agent include peroxides such as benzoyl peroxide, t-butyl peroxy isopropyl monocarbonate, t-amyl peroxy isopropyl monocarbonate, t-hexyl peroxy isopropyl monocarbonate, 1,1-bis(t-butyl peroxy) cyclohexane, t-butyl peroxy-2-ethyl hexanoate, amyl peroxy-2-ethyl hexanoate, 2-ethyl hexyl peroxy-2-ethyl hexanoate, t-butyl peroxy benzoate, t-hexyl peroxy benzoate, and t-hexyl peroxy acetate, and preferably, peroxy isopropyl monocarbonates, i.e., t-butyl peroxy isopropyl monocarbonate, t-amyl peroxy isopropyl monocarbonate, t-hexyl peroxy isopropyl monocarbonate, and t-butyl peroxy benzoate.

The mixing ratio of the curing agent relative to 100 parts by mass of the resin component is, for example, 0.5 parts by mass or more, preferably 0.8 parts by mass or more, and for example, 10 parts by mass or less, preferably 3 parts by mass or less.

The curing agent can be used singly, or can be used in combination of two or more.

Examples of the release agent include fatty acids such as stearic acid and lauric acid; fatty acid metal salts such as zinc stearate and calcium stearate; paraffin; liquid wax; fluorine polymer; and silicon polymer, and preferably, fatty acid metal salt, more preferably, zinc stearate is used.

For the release agent, for example, a mixture of surfactant and copolymer such as fatty acid alkyl ester and alkyl ammonium salt can be used, and for such a release agent, a commercially available product can also be used, to be specific, for example, BYK-P 9051 and BYK-P 9060, BYK-P 9080 (manufactured by BYK-Chemie).

The mixing ratio of the release agent relative to 100 parts by mass of the resin component is, for example, 1 part by mass or more, preferably 3 parts by mass or more, and for example, 10 parts by mass or less.

The release agent can be used singly, or can be used in combination of two or more.

Examples of the coloring agent include, without particular limitation, for example, titanium oxide, polyester toner (titanium oxide and/or carbon black-containing polyester coloring agent), and preferably, polyester toner is used.

The mixing ratio of the coloring agent relative to 100 parts by mass of the resin component is, for example, 1 part by mass or more, preferably 3 parts by mass or more, and for example, 20 parts by mass or less.

The coloring agent can be used singly, or can be used in combination of two or more.

Examples of the filler include inorganic fillers such as the following: oxides such as alumina and titania; hydroxides such as magnesium hydroxide (excluding aluminum hydroxide); carbonates such as calcium carbonate; sulfates such as barium sulfate; silica (for example, crystalline silica, molten silica, fumed silica, dry silica (aerosil), etc.); glass powder; hollow fillers such as glass balloon, silica balloon, and alumina balloon; silicates such as silica sand, diatomite, mica, clay, kaolin, and talc; fluorides such as fluorite; phosphoric acid salts such as calcium phosphate; and clay minerals such as smectite.

The hollow filler has an average particle size of, for example, 5 μm or more, and for example, 50 μm or less.

The hollow filler has a density of, for example, 0.1 g/mL or more, and for example, 1.0 g/mL or less.

For the filler, preferably, hollow filler, more preferably, glass balloon is used.

When the unsaturated polyester resin composition contains the filler, density of the molded article (described later) produced by using the unsaturated polyester resin composition can be made low.

The mixing ratio of the filler relative to 100 parts by mass of the resin component is, for example, 1 part by mass or more, preferably 3 parts by mass or more, and for example, 50 parts by mass or less, preferably 30 parts by mass or less.

The filler can be used singly, or can be used in combination of two or more.

The viscosity reducing agent is blended so as to decrease the viscosity of the unsaturated polyester resin composition to a suitable one for heat compression molding, and a known viscosity reducing agent is used. For the viscosity reducing agent, a commercially available product can be used, and to be specific, BYK-W996 (manufactured by BYK-Chemie) is used.

The mixing ratio of the viscosity reducing agent relative to 100 parts by mass of the resin component is, for example, 1 part by mass or more, and for example, 10 parts by mass or less.

The viscosity reducing agent can be used singly, or can be used in combination of two or more.

Examples of the fire retardant include halogen fire retardants such as bromine fire retardant; non-halogen fire retardants such as phosphorus fire retardant, inorganic fire retardant, and nitrogen compound fire retardant.

Examples of the bromine fire retardant include hexa bromo benzene; tetra bromo bisphenol; bromo diphenyls such as tetra bromo diphenyl, hexa bromo diphenyl, deca-bromo diphenyl, and decabromo diphenyl ethane (bis penta bromo phenyl ethane); and bromo diphenyl ethers such as tetra bromo diphenyl ether, hexa bromo diphenyl ether, and decabromo diphenyl ether.

Examples of the phosphorus fire retardant include red phosphorus; phosphoric acid esters such as trimethyl phosphate, triethyl phosphate, tributyl phosphate, and tricresyl phosphate; poly phosphoric acid salts such as poly phosphoric acid ammonium; IFR (Intumescent) expandable fire retardant of a mixture of auxiliary agent such as poly phosphoric acid ammonium and pentaerythritol, and carbon supplier such as melamine; and phosphinic acid metal salt.

For the phosphorus fire retardant, a commercially available product can be used, and to be specific, Exolit AP series, Op series, and RP series (manufactured by Clariant) are used.

For the inorganic fire retardant, for example, antimony oxides such as diantimony trioxide, zinc stannate, boric acid zinc, and formulation thereof are used, and preferably, diantimony trioxide is used.

For the nitrogen compound fire retardant, for example, an azo alkane compound, hindered amine compound, and melamine compound are used.

For the fire retardant, preferably, non-halogen fire retardant is used.

That is, preferably, the unsaturated polyester resin composition substantially contains no halogen fire retardant.

"Substantially contains no halogen fire retardant" means, relative to the unsaturated polyester resin composition the halogen fire retardant is, for example, 1.0 mass % or less, preferably 0.1 mass % or less.

When the unsaturated polyester resin composition substantially contains no halogen fire retardant, gas generation based on halogen at the time of burning can be suppressed, environment pollution can be suppressed.

For the fire retardant, more preferably, a phosphorus fire retardant, even more preferably, phosphoric add ester, particularly preferably, poly phosphoric acid ammonium and phosphinic acid metal salt are used.

That is, more preferably, unsaturated polyester resin composition contains phosphorus fire retardant.

When the unsaturated polyester resin composition contains phosphorus fire retardant, flame retardancy improves, and therefore aluminum hydroxide content can be decreased. As a result, the linear expansion coefficient of the molded article can be made high.

The mixing ratio of the fire retardant relative to 100 parts by mass of the resin component is, for example, 15 parts by mass or more, preferably 25 parts by mass or more, and for example, 35 parts by mass or less.

The mixing ratio of the aluminum hydroxide relative to fire retardant (aluminum hydroxide/fire retardant) is, for example, 5 or more, preferably 15 or less.

The fire retardant can be used singly, or can be used in combination of two or more.

The thickening agent is blended so as to increase the viscosity of the unsaturated polyester resin composition to a suitable one for heat compression molding, and preferably, it is blended before the reinforced fiber (described later) is impregnated with the unsaturated polyester resin composition (preferably, immediately before). Examples thereof include alkaline earth metal oxides such as magnesium oxide; alkaline earth metal hydroxides such as magnesium hydroxide and calcium hydroxide; and preferably, alkaline earth metal oxide, more preferably, magnesium oxide is used.

The mixing ratio of the thickening agent relative to 100 parts by mass of the resin component is, for example, 0.5 parts by mass or more, and for example, 10 parts by mass or less, preferably 3 parts by mass or less.

The thickening agent can be used singly, or can be used in combination of two or more.

To the unsaturated polyester resin composition, as necessary, additives such as, for example, a patterning material, antibacterial, hydrophilic agent, photocatalyst, ultraviolet absorber, ultraviolet ray stabilizer, separation preventing agent, silane coupling agent, antistatic agent, lubricating dispersing agent, and dispersing agent, thixotropic agents, thixotropic stabilizer, and polymerization accelerator can be blended to the extent that will not hinder the effects of the invention. These additives can be used singly, or can be used in combination of two or more.

In the description above, the unsaturated polyester, polymerizable monomer, low profile agent, and other thermosetting resin blended as necessary, aluminum hydroxide, and additives blended as necessary are blended to produce an unsaturated polyester resin composition. However, the following is also possible: first, the unsaturated polyester is dissolved in a polymerizable monomer to prepare an unsaturated polyester resin, and thereafter, the produced unsaturated polyester resin, polymerizable monomer, low profile agent, other thermosetting resin blended as necessary, aluminum hydroxide, and additives blended as necessary can be blended.

In preparation of the unsaturated polyester resin, the unsaturated polyester and polymerizable monomer are blended, and as necessary, suitably, the above-described additives (for example, polymerization inhibitor) can be blended.

In preparation of the unsaturated polyester resin, the mixing ratio of the polymerizable monomer relative to 100 parts by mass of the unsaturated polyester is, for example, 35 parts by mass or more, and 150 parts by mass or less, and the mixing ratio of the polymerization inhibitor relative to 100 parts by mass of the unsaturated polyester is, for example, 0.001 parts by mass or more, preferably 0.005 parts by mass or more, and for example, 0.1 parts by mass or less, preferably 0.05 parts by mass or less.

By blending a known reinforced fiber such as glass fiber to such an unsaturated polyester resin composition, the molding material can be prepared. Then, from the molding material, a molded article can be produced by a known method.

Examples of the reinforced fiber include inorganic fiber such as glass fiber, carbon fiber, metal fiber, and ceramics fiber; organic fiber such as poly vinyl alcohol fiber, polyester fiber, polyamide fiber, fluorine resin fiber, and phenol fiber; natural fiber such as hemp and Kenaf, and preferably, inorganic fiber, more preferably, carbon fiber, glass fiber, even more preferably, glass fiber is used.

These examples of the reinforced fiber can be in the form of, for example, cloth such as roving cloth; mats such as chopped strand mat, preformable mat, continuous strand mat, and surfacing mat; strand; roved; nonwoven fabric; paper, and preferably, it is roved.

Of these examples of the reinforced fiber, preferably, carbon fiber, glass fiber, more preferably, glass fiber is used. To be more specific, glass roving is preferably used, to be even more specific, chopped glass, which is glass roving cut into a predetermined length.

The length of reinforced fiber is not particularly limited, and for example, it is 1.5 mm or more. When the above-described unsaturated polyester resin composition is used to prepare the molding material, in view of ensuring smoothness and improving strength even if reinforced fiber is long, preferably 5 mm or more, more preferably 15 mm or more, and for example, 80 mm or less, preferably 40 mm or less.

The molding material can be produced as a sheet by, for example, impregnating the reinforced fiber with the unsaturated polyester resin composition.

The mixing ratio of the reinforced fiber (for example, when reinforced fiber is glass fiber, hereinafter referred to as glass content) relative to a total amount of the unsaturated polyester resin composition and reinforced fiber is, for example, 5 mass % or more, preferably 10 mass % or more, and for example, 50 mass % or less, preferably 35 mass % or less.

The molding material can be prepare by a known method including, for example, SMC (sheet molding compound), TMC (thick molding compound), and BMC (bulk molding compound), and preferably, in view of improving strength of the molded article, SMC and TMC, which are suitable for preparing a molding material in which long reinforced fiber (for example, 5 mm or more) is blended is used.

In this manner, a molding material including the above-described unsaturated polyester resin composition and reinforced fiber is produced.

Relative to the molding material, in the above-described unsaturated polyester resin composition, a filler-excluding component (volume content), i.e., the component excluding aluminum hydroxide and filler blended as necessary, in total amount is, for example, 30 vol % or more, preferably 40 vol % or more, and for example, 55 vol % or less, preferably 50 vol % or less.

When the volume content of the filler-excluding component is the above-described lower limit or more and the above-described upper limit or less, the reinforced fiber can be sufficiently impregnated with unsaturated polyester resin composition, with excellent production stability.

The volume content of aluminum hydroxide relative to the molding material is, for example, 25 vol % or more, and for example, 40 vol % or less.

When the unsaturated polyester resin composition contains a hollow filler as the filler, the volume content of hollow filler relative to the molding material is, for example, 5 vol % or more, and for example, 15 vol % or less.

The volume content of reinforced fiber relative to the molding material is, for example, 15 vol % or more, and for example, 25 vol % or less.

The molding material contains the above-described unsaturated polyester resin composition, the molded article produced by using the molding material has excellent low shrinkage, excellent flame retardancy, and excellent dimensional stability even combined with light metal.

Then, the viscosity is increased so that the molding material can go through heat compression molding (described later), and it is aged preferably, for example, at 20° C. or more 50° C. or less, for 8 hours or more and 120 hours or less.

In this manner, the molding material is formed into, for example, a sheet. That is, the molding material is in the form of a sheet.

The molded article can be produced by subjecting the molding material to heat compression molding by a known method.

The conditions of the heat compression molding are suitably set in accordance with purpose and use, and to be specific, the molding temperature is, for example, 100° C. or more, and for example, 200° C. or less, and the molding pressure is, for example, 0.1 MPa or more, preferably 1 MPa or more, more preferably 5 MPa or more, and for example, 20 MPa or less, preferably 15 MPa or less.

In this manner, the molding material is cured, and the molding material is molded.

In this manner, the molded article is produced.

The molded article contains the above-described cured product of the molding material, and therefore has excellent low shrinkage properties and excellent flame retardancy.

In the above-described unsaturated polyester resin composition, polybasic acid contains the unsaturated polybasic acid at the above-described predetermined ratio. The above-described unsaturated polyester resin composition contains polyvinyl acetate at the above-described predetermined ratio, and furthermore, aluminum hydroxide is contained at the above-described predetermined ratio, and therefore the molded article produced by using the above-described unsaturated polyester resin composition has a linear expansion coefficient of, for example, more than 17.0 ppm/° C., preferably 18.0 ppm/° C. or more, more preferably 18.5 ppm/° C. or more, and for example, 25.0 ppm/° C. or less.

The molded article has a linear expansion coefficient near the linear expansion coefficient of light metals such as aluminum (linear expansion coefficient 23.0 ppm/° C.) and magnesium (linear expansion coefficient 25.4 ppm/° C.), and the difference of the linear expansion coefficient of the molded article and the linear expansion coefficient of the light metal is small.

To be specific, when the light metal is aluminum, the difference between the linear expansion coefficient of the molded article and the linear expansion coefficient of aluminum (linear expansion coefficient of aluminum-linear expansion coefficient of the molded article) is, for example, −2 or more, and for example, 6 or less, preferably 5 or less, more preferably less than 4.5.
therefore, the molded article has excellent dimensional stability even combined with light metal.

Meanwhile, the linear expansion coefficient of the molded article composed of the molding material containing calcium carbonate such as the one in Patent Document 1 is 0 ppm/° C. or more and 16 ppm/° C. or less, and the difference from the linear expansion coefficient of the light metal (for example, aluminum (linear expansion coefficient 23.0 ppm/° C.)) is large. Therefore, when such a molded article is combined with light metal, there are disadvantages in that dimensional stability will be poor: the dimensional difference due to thermal change, gaps between components change, stress is generated at joint portion, and sealing properties are decreased at sealed portion.

Examples of the light metal include aluminum and magnesium, and preferably, aluminum is used.

The measurement method for the linear expansion coefficient of the molded article is to be described later in Examples.

The molded article is preferably used in the battery pack housing for electric vehicles.

Figure 1:
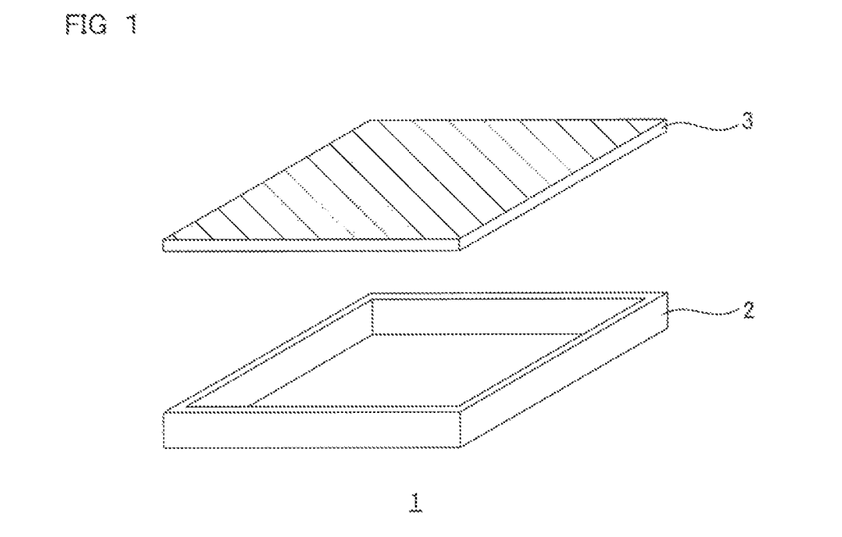
FIG. 1 is a schematic perspective view showing an embodiment of the battery pack housing for electric vehicles of the present invention.

As shown in FIG. 1, the battery pack housing 1 for electric vehicles is combined with a tray member 2 as an example of aluminum member, and a tray member 2, and a cover member 3 composed of the above-described molded article.

The tray member 2 is a vessel that accommodates a battery (not shown), and has a box shape with its one side opened. The tray member 2 is composed of aluminum.

The cover member 3 has a plate shape to close the opening provided in the tray member 2, and its size is the same as that of the opening.

Figure 2:
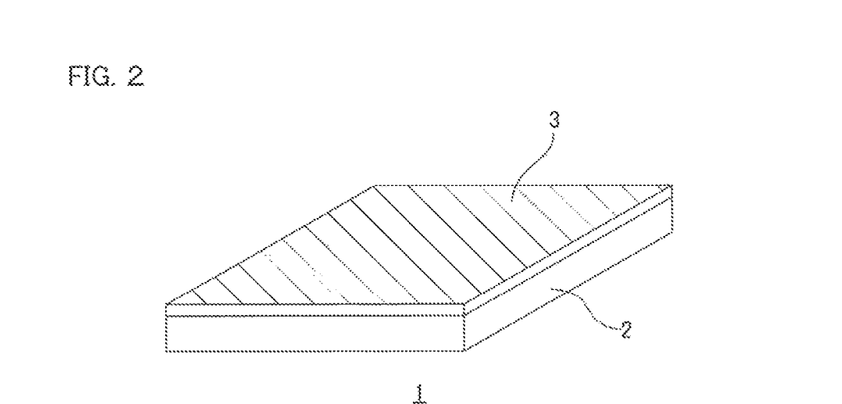
FIG. 2 is a schematic perspective view showing a tray member and a cover member combined in the battery pack housing for electric vehicles in FIG. 1.

As shown in FIG. 2, in the battery pack housing 1 for electric vehicles, the tray member 2 is combined with the cover member 3 so that the cover member 3 closes the opening provided in the tray member 2.

In the battery pack housing 1 for electric vehicles, the molded article is combined with the aluminum member.

As described above, the difference between the linear expansion coefficient of the molded article and the linear expansion coefficient of aluminum is small, and therefore dimensional stability is excellent.

The battery pack housing 1 for electric vehicles includes the cover member 3 composed of the above-described molded article, and therefore it has excellent low shrinkage and excellent flame retardancy.

EXAMPLES

The specific numeral values used in the description below, such as mixing ratio (content), physical property values, and parameters can be replaced with corresponding mixing ratio (content), physical property values, parameters in the above-described "DESCRIPTION OF EMBODIMENTS", including the upper limit value (numeral values defined with "or less", and "less than") or the lower limit value (numeral values defined with "or more", and "more than"). The "parts" and "%" are based on mass unless otherwise specified.

1. Preparation of Unsaturated Polyester Resin

Synthesis Example 1

A flask equipped with a thermometer, nitrogen gas inlet tube, reflux condenser, and mixer was charged with 10.0 mol of maleic anhydride, 6.5 mol of propylene glycol, 4.0 mol of neopentyl glycol, and the mixture was subjected to polycondensation reaction at 200° C. to 210° C. while stirring under nitrogen gas atmosphere, thereby producing unsaturated polyester with an acid value of 26.5 mgKOH/g. The acid value was measured by a method in accordance with JIS K6901 (2008).

Relative to 100 parts by mass of the produced unsaturated polyester, 0.01 parts by mass of hydroquinone and 66.7 parts by mass of styrene were added as polymerization inhibitors, and the mixture was stirred homogenously, thereby producing unsaturated polyester resin (styrene content 40%).

Synthesis Example 2

A flask equipped with a thermometer, nitrogen gas inlet tube, reflux condenser, and mixer was charged with 3.3 mol of isophthalic acid and 10.5 mol of propylene glycol, and the mixture was subjected to polycondensation reaction at 200° C. to 210° C. while stirring under nitrogen gas atmosphere. Thereafter, when the acid value reached 20 mgKOH/g, the reaction product was cooled to 150° C., and 6.7 mol of maleic anhydride was charged, then the mixture was allowed to react again at 210° C. to 220° C., thereby producing unsaturated polyester with an acid value of 27. 5 mgKOH/g. Relative to 100 parts by mass of the produced unsaturated polyester, 0.01 parts by mass of hydroquinone and 66.7 parts by mass of styrene as polymerization inhibitors were added, and the mixture was stirred homogenously, thereby producing unsaturated polyester resin (styrene content 40%).

2. Preparation of Saturated Polyester Resin

Synthesis Example 3

A flask equipped with a thermometer, nitrogen gas inlet tube, reflux condenser, and mixer was charged with 4.0 mol of isophthalic acid and 10.5 mol of neopentyl glycol, and the mixture was subjected to polycondensation reaction at 200°

C. to 210° C. while stirring under nitrogen gas atmosphere. Thereafter, when the acid value of the reaction product reached 10 mgKOH/g, it was cooled to 150° C., and 6.0 mol of adipic acid was charged, and then allowed to react again at 210° C. to 220° C., thereby producing saturated polyester with an acid value of 9.5 mgKOH/g. Relative to 100 parts by mass of the produced saturated polyester, 0.01 parts by mass of hydroquinone and 66.7 parts by mass of styrene as polymerization inhibitors were added, and the mixture was stirred homogenously, thereby producing saturated polyester resin (styrene content 40%).

3. Preparation of Vinyl Ester Resin

Synthesis Example 4

A flask equipped with a mixer, reflux condenser, and gas inlet tube was charged with 114 parts by mass of bisphenol A (1.0 equivalent) and 555 parts by mass of bisphenol A epoxy resin (epoxy equivalent 185) (3.0 equivalent), and as a catalyst, 0.15 parts by mass of triethyl benzyl ammonium chloride was charged, and the mixture was allowed to react at 150° C. for 5 hours while introducing nitrogen, thereby producing non-brominated epoxy resin with an epoxy equivalent of 335. After cooling to 120° C., 0.10 parts by mass of hydroquinone as a polymerization inhibitor, 1.50 parts by mass of tri ethyl benzyl ammonium chloride as a catalyst, and 176 parts by mass of methacrylic acid (2.05 equivalent) were added, and the mixture was allowed to react while introducing air at 110° C. for 8 hours, thereby producing vinyl ester with and acid value of 8.5 mgKOH/g. Then, 563 parts by mass of styrene was added to the vinyl ester, thereby producing vinyl ester resin with a styrene content of 40 mass %.

4. Preparation of Brominated Vinyl Ester Resin

Synthesis Example 5

To the reaction vessel of Synthesis Example 3, as brominated epoxy resin, 400 parts by mass of tetra bromo bisphenol A epoxy resin (epoxy equivalent 400, bromine content 48.0%) (1.0 equivalent), 88.2 parts by mass of methacrylic acid (1.025 equivalent), 0.05 parts by mass of hydroquinone as a polymerization inhibitor, and 0.5 parts by mass of tri ethyl benzyl ammonium chloride as a catalyst, and the mixture was allowed to react at 110° C. for 8 hours while introducing air, thereby producing brominated vinyl ester with an acid value of 9.0 mgKOH/g. Then, 325 parts by mass of styrene was added to the brominated vinyl ester, thereby producing brominated vinyl ester resin (bromine content 23.6%) containing 40 mass % of styrene.

5. Preparation of Unsaturated Polyester Resin Composition and Molding Material

Example 1

60 parts by mass of the unsaturated polyester resin of Synthesis Example 1 (unsaturated polyester 36 parts by mass, styrene 24 parts by mass), 15 parts by mass (polyvinyl acetate 6 parts by mass, styrene 9 parts by mass) of polyvinyl acetate solution (40% styrene solution of polyvinyl acetate) as a low profile agent, and 20 parts by mass of saturated polyester resin (saturated polyester 12 parts by mass, styrene 8 parts by mass) of Synthesis Example 3, 5 parts by mass of styrene as a polymerizable monomer, 0.05 parts by mass of p-benzoquinone as a polymerization inhibitor, 1.0 part by mass of perbutyl I-75 (containing 75% t-butyl peroxy isopropyl monocarbonate, manufactured by NOF corporation) as the curing agent, as the release agent, 5 parts by mass of stearic acid zinc, as the coloring agent, 10 parts by mass of black polyester toner (carbon black dispersed in polyester resin), 250 parts by mass of aluminum hydroxide (average particle size 8 μm), 3 parts by mass of viscosity reducing agent (manufactured by BYK-Chemie, BYK-W996) were mixed, thereby producing an unsaturated polyester resin composition.

To the unsaturated polyester resin composition, 0.8 parts by mass of magnesium oxide was added as the thickening agent, and thereafter, chopped glass, which is glass roving continuously cut into 25 mm, was added as the reinforced fiber, so that the glass content was 28 mass %. After obtaining a molding material (SMC) with a known SMC impregnation device, it was aged at 40° C. for 48 hours, and the viscosity was increased until the molding material was ready for heat compression molding.

Example 2 to Example 15 and Comparative Example 1 to Comparative Example 7

A molding material was produced in the same manner as in Example 1, except that the mixing formulation was changed in accordance with Table 1 to Table 3.

In Example 2, for the reinforced fiber, carbon fiber (T700SC-12000, manufactured by Toray Industries, Inc.) was used.

In Example 5, for the fire retardant, bromine fire retardant (bis penta bromo phenyl ethane) and diantimony trioxide were used.

In Example 3, Example 6, and Example 7, for the fire retardant, phosphinic acid metal salt (OP1230 (trade name, Exolit OP1230, manufactured by Clariant International Ltd., phosphorus content 23%)).

In Example 8, for the fire retardant, poly phosphoric acid ammonium (trade name, Exolit AP422, manufactured by Clariant International Ltd., phosphorus content 31%) was used.

In Example 9, for the fire retardant, red phosphorus was used.

In Example 4, Example 6, and Example 10, for the filler, glass balloon (average particle size: 20 μm, density 0.46 g/mL) was used.

In Example 13, as the release agent, BYK-P 9060 (manufactured by BYK-Chemie) was used.

In Comparative Example 1, for the filler, calcium carbonate with an average particle size of about 3 μm was used.

In Comparative Example 5, as a low profile agent, polystyrene solution (35% styrene solution of polystyrene with weight-average molecular weight of about 250000) and polyethylene powder (polyethylene powder with average particle size of about 30 μm) were used.

6. Evaluation (Molding Compression Rate)

The molding material was subjected to heat compression molding using a flat gold plate of 300 mm×300 mm, thereby producing a flat-plate molded article having a thickness of 4 mm.

The molding was conducted with the following conditions: the mold temperature with the product side and the reverse side of 140° C., molding pressure 10 MPa, and retaining time inside the mold 420 seconds. Thereafter, the molded article was demolded from the mold, and immediately cooled between iron plates. Thereafter, the molded article was allowed to stand at 25° C. for 2.4 hours, and the four sides of the molded article at 25° C. were measured, and the compression rate was measured by the ratio with the size of the above-described flat plate mold. The results are shown in Tables 4 to 6.

Evaluation was conducted based on the following criteria regarding the compression rate. The results are shown in Tables 4 to 6.
Evaluation Criteria:
  Good: compression rate was less than 0.
  Fair: compression rate was 0 or more and less than 0.10.
  Bad: compression rate was 0.10 or more.
(Flame Retardancy)

A molding material was produced in the same manner as the production of the molding compression rate measurement flat plates, thereby producing molded plates with a thickness of 3 mm and 4 mm. A test piece was cut out from the molded plates, and flammability test of UL standard (Underwriters Laboratories Inc.) in accordance with UL94 standard (flammability of plastic materials) was conducted. The test piece with a thickness of 3 mm was evaluated if it satisfied 5 VA, V-0 standard, and the test piece with a thickness of 4 mm was evaluated if it satisfied V-0 standard. 5 VA standard is higher than V-0 standard for Flame retardancy. The results are shown in Tables 4 to 6.

The flame retardancy was evaluated based on the following standard. The results are shown in Tables 4 to 6.
Evaluation Criteria:
  Excellent: compatible with 5 VA standard (thickness 3 mm).
  Good: compatible with V-0 standard (thickness 3 mm).
  Fair: compatible with V-0 standard (thickness 4 mm).
  Bad: not compatible with V-0 standard (thickness 4 mm).
(Linear Expansion Coefficient)

The flat plate molded article having a thickness of 4 mm for molding compression rate measurement was cut out to produce a test piece (4 mm×4 mm×5 mm), and linear expansion coefficient of the molded article in horizontal direction was measured with a thermomechanical analyzer (manufactured by Hitachi High-Tech Science Corporation, EXSTAR TMA SS7100) using an expansion/compression probe. The temperature was increased with a temperature increase speed of 5° C./min from room temperature to 100° C., and the linear expansion coefficient in the range of 50° C. to 80° C. was measured. The results are shown in Tables 4 to 6.

The difference between the obtained linear expansion coefficient and the linear expansion coefficient of aluminum (23.0 ppm/° C.) is shown in Table 4 to Table 6.

Linear expansion coefficient was evaluated based on the following. The results are shown in Tables 4 to 6.
  Excellent: linear expansion coefficient was more than 18.5 ppm/° C.
  Good: linear expansion coefficient was more than 17.0 ppm/° C. and 18.5 ppm/° C. or less.
  Fair: linear expansion coefficient was more than 16.0 ppm/° C. and 17.0 ppm/° C. or less.
  Bad: linear expansion coefficient was 16.0 ppm/° C. or less.

(Smoke Generation)

In the above-described flame retardancy test, in the V-0 determination test using a test piece with a thickness of 3 mm, occurrence of black smoke at the time of burning was visually checked.

Smoke generation was evaluated based on the following criteria. The results are shown in Tables 4 to 6.
  Good: no black smoke generated.
  Bad: black smoke generated.
(Production Stability)
<Evaluation on Impregnation State>

Immediately after the SMC production, the carrier film was stripped off with a cutter knife, and impregnation state of glass fiber with the unsaturated polyester resin composition was evaluated visually.

Impregnation state evaluated based on the following criteria. The results are shown in Tables 4 to 6.
  Good: glass fiber was sufficiently wet with unsaturated polyester resin composition, and no glass fiber not impregnated with unsaturated polyester resin composition was observed.
  Bad: glass fiber was not impregnated with the unsaturated polyester resin composition was partially found.
<Evaluation on Film Releasability>

The carrier film of the aged molding material (SMC) was stripped off with a cutter knife, and film releasability was evaluated.

Film releasability was evaluated based on the following criteria. The results are shown in Tables 4 to 6.
  Good: film was released smoothly with less tuck on SMC
  Bad: obvious tucks were found on SMC. Alternatively, separation of components was observed partially when releasing the film.
(Density)

A test piece was cut out from the molded article produced for molding compression rate measurement, and density was measured in accordance with JIS K6911 (1995). The results are shown in Tables 4 to 6.
(Flexural Properties)

A test piece (length 80 mm, width 10 mm) was cut out from the molded article produced for molding compression rate measurement, and bending strength at 23° C. and 90° C. and flexural modulus were measured in accordance with JIS K7017 (1999). The results are shown in Tables 4 to 6.

Furthermore, from the measurement results of flexural modulus and density, specific rigidity at 23° C. and 90° C. was calculated based on formula (1) below. The results are shown in Tables 4 to 6.

$$\text{Specific rigidity} = (\text{flexura modulus})^{1/3}/(\text{density}) \quad (1)$$

(Tensile Properties)

A test piece was cut out from the molded article produced for molding compression rate measurement, and tensile strength at 23° C. and tensile modulus were measured in accordance with JIS K7164 (2005). The results are shown in Tables 4 to 6.

TABLE 1

| Example No. | | | Unit | Example 1 | Example 2 | Example 3 | Example 4 | Example 5 | Example 6 | Example 7 | Example 8 |
|---|---|---|---|---|---|---|---|---|---|---|---|
| Resin component | Unsaturated polyester resin | Unsaturated polyester resin of Synthesis Example 1 | Parts by mass | 60 | 60 | 60 | 60 | 60 | 60 | 60 | 60 |

TABLE 1-continued

| | Example No. | | Unit | Example 1 | Example 2 | Example 3 | Example 4 | Example 5 | Example 6 | Example 7 | Example 8 |
|---|---|---|---|---|---|---|---|---|---|---|---|
| | | Unsaturated polyester resin of Synthesis Example 2 | Parts by mass | — | — | — | — | — | — | — | — |
| | Polymenzable monomer | Styrene | Parts by mass | 5 | 5 | 5 | 5 | 5 | 5 | 5 | 5 |
| | Low profile agent | Polyvinyl acetate solution | Parts by mass | 15 | 15 | 15 | 15 | 15 | 15 | 15 | 15 |
| | | Saturated polyester resin of Synthesis Example 3 | Parts by mass | 20 | 20 | 20 | 20 | 20 | 20 | 20 | 20 |
| | | Polystyrene solution | Parts by mass | — | — | — | — | — | — | — | — |
| | | Polyethylene powder | Parts by mass | — | — | — | — | — | — | — | — |
| | Other thermosetting resin | Vinyl ester resin of Synthesis Example 4 | Parts by mass | — | — | — | — | — | — | — | — |
| | | Brominated vinyl ester resin of Synthesis Example 5 | Parts by mass | — | — | — | — | — | — | — | — |
| | Aluminum hydroxide | | Parts by mass | 250 | 160 | 160 | 160 | 200 | 200 | 200 | 200 |
| Polymerization inhibitor | p-Benzoquinone | | Parts by mass | 0.05 | 0.05 | 0.05 | 0.05 | 0.05 | 0.05 | 0.05 | 0.05 |
| Curing agent | Perbutyl I-75 | | Parts by mass | 1.0 | 1.0 | 1.0 | 1.0 | 1.0 | 1.0 | 1.0 | 1.0 |
| Release agent | Zinc Stearate | | Parts by mass | 5 | 5 | 5 | 5 | 5 | 5 | 5 | 5 |
| | BYK-P9060 | | Parts by mass | — | — | — | — | — | — | — | — |
| Coloring agent | Black polyester toner | | Parts by mass | 10 | 10 | 10 | 10 | 10 | 10 | 10 | 10 |
| Filler | Calcium carbonate | | Parts by mass | — | — | — | — | — | — | — | — |
| | Glass balloon | | Parts by mass | — | — | — | 10 | — | 10 | — | — |
| Viscosity reducing agent | BYK-W996 | | Parts by mass | 3 | 2 | 2 | 2 | 3 | 3 | 3 | 3 |
| Fire retardant | Phosphorus fire retardant | OP1230 | Parts by mass | — | — | — | 30 | — | 30 | 30 | — |
| | | AP422 | Parts by mass | — | — | — | — | — | — | — | 20 |
| | | Red phosphorus | Parts by mass | — | — | — | — | — | — | — | — |
| | Bromine fire retardant | BPBPE (Bis penta bromo phenyl ethane) | Parts by mass | — | — | — | — | 15 | — | — | — |
| | Antimony oxide | Diantimony trioxide | Parts by mass | — | — | — | — | 5 | — | — | — |
| Thickening agent | Magnesium oxide | | Parts by mass | 0.8 | 0.8 | 0.8 | 0.8 | 0.8 | 0.8 | 0.8 | 0.8 |
| Reinforced fiber | Glass fiber (fiber length (25 mm)) | | % | 28 | — | 29 | 29 | 28 | 30 | 29 | 28 |
| | Carbon fiber (fiber length (25 mm)) | | % | — | 20 | — | — | — | — | — | — |
| | Mixing ratio of the unsaturated polybasic acid relative to 100 mol % of polybasic acid | | mol % | 100 | 100 | 100 | 100 | 100 | 100 | 100 | 100 |
| | The mixing ratio of the polyvinyl acetate relative to 100 parts by mass of resin component | | Parts by mass | 6 | 6 | 6 | 6 | 6 | 6 | 6 | 6 |
| | The mixing ratio of the aluminum hydroxide relative to 100 parts by mass of resin component | | Parts by mass | 250 | 160 | 160 | 160 | 200 | 200 | 200 | 200 |
| | The mixing ratio of the saturated polyester relative to 100 parts by mass of resin component | | Parts by mass | 12 | 12 | 12 | 12 | 12 | 12 | 12 | 12 |
| Volume content in molding material | Filler-excluding component | | vol % | 41.2 | 51.4 | 50.0 | 48.1 | 47.0 | 44.8 | 49.1 | 47.4 |
| | Aluminum hydroxide | | vol % | 38.0 | 30.6 | 29.8 | 23.7 | 32.5 | 27.6 | 30.3 | 32.3 |
| | Filler | Glass balloon | vol % | — | — | — | 7.8 | — | 7.3 | — | — |
| | | Calcium carbonate | vol % | — | — | — | — | — | — | — | — |
| | Reinforced fiber | | vol % | 20.8 | 18.0 | 20.2 | 20.3 | 20.5 | 20.3 | 20.6 | 20.3 |

TABLE 2

| | Example No. | | Unit | Example 9 | Example 10 | Example 11 | Example 12 | Example 13 | Example 14 | Example 15 |
|---|---|---|---|---|---|---|---|---|---|---|
| Resin component | Unsaturated polyester resin | Unsaturated polyester resin of Synthesis Example 1 | Parts by mass | 60 | 60 | 60 | 55 | 60 | 50 | 55 |
| | | Unsaturated polyester resin of Synthesis Example 2 | Parts by mass | — | — | — | — | — | — | — |
| | Polymenzable monomer | Styrene | Parts by mass | 5 | 5 | 15 | — | 5 | 5 | 5 |
| | Low profile agent | Polyvinyl acetate solution | Parts by mass | 15 | 15 | 15 | 15 | 15 | 15 | 15 |
| | | Saturated polyester resin of Synthesis Example 3 | Parts by mass | 20 | 20 | 10 | 30 | 20 | 20 | — |
| | | Polystyrene solution | Parts by mass | — | — | — | — | — | — | — |
| | | Polyethylene powder | Parts by mass | — | — | — | — | — | — | — |
| | Other thermosetting resin | Vinyl ester resin of Synthesis Example 4 | Parts by mass | — | — | — | — | — | 10 | — |
| | | Brominated vinyl ester resin of Synthesis Example 5 | Parts by mass | — | — | — | — | — | — | 25 |
| | Aluminum hydroxide | | Parts by mass | 200 | 240 | 160 | 160 | 160 | 150 | 200 |

TABLE 2-continued

| Example No. | | | Unit | Example 9 | Example 10 | Example 11 | Example 12 | Example 13 | Example 14 | Example 15 |
|---|---|---|---|---|---|---|---|---|---|---|
| Polymerization inhibitor | p-Benzoquinone | | Parts by mass | 0.05 | 0.05 | 0.05 | 0.05 | 0.05 | 0.05 | 0.05 |
| Curing agent | Perbutyl I-75 | | Parts by mass | 1.0 | 1.0 | 1.0 | 1.0 | 1.0 | 1.0 | 1.0 |
| Release agent | Zinc Stearate | | Parts by mass | 5 | 5 | 5 | 5 | 5 | 5 | 5 |
| | BYK-P9060 | | Parts by mass | — | — | — | — | 5 | — | — |
| Coloring agent | Black polyester toner | | Parts by mass | 10 | 10 | 10 | 10 | 10 | 10 | 10 |
| Filler | Calcium carbonate | | Parts by mass | — | — | — | — | — | — | — |
| | Glass balloon | | Parts by mass | — | 20 | — | — | — | — | — |
| Viscosity reducing agent | BYK-W996 | | Parts by mass | 3 | 3 | 3 | 3 | 2 | 2 | 3 |
| Fire retardant | Phosphorus fire retardant | OP1230 | Parts by mass | — | — | — | — | — | — | — |
| | | AP422 | Parts by mass | — | — | — | — | — | — | — |
| | | Red phosphorus | Parts by mass | 20 | — | — | — | — | — | — |
| | Bromine fire retardant | BPBPE (Bis penta bromo phenyl ethane) | Parts by mass | — | — | — | — | — | — | — |
| | Antimony oxide | Diantimony trioxide | Parts by mass | — | — | — | — | — | — | — |
| Thickening agent | Magnesium oxide | | Parts by mass | 0.8 | 0.8 | 0.8 | 0.8 | 0.8 | 0.8 | 0.8 |
| Reinforced fiber | Glass fiber (fiber length (25 mm)) | | % | 28 | 30 | 29 | 29 | 29 | 29 | 28 |
| | Carbon fiber (fiber length (25 mm)) | | | — | — | — | — | — | — | — |
| Mixing ratio of the unsaturated polybasic acid relative to 100 mol % of polybasic acid | | | mol % | 100 | 100 | 100 | 100 | 100 | 100 | 100 |
| The mixing ratio of the polyvinyl acetate relative to 100 parts by mass of resin component | | | Parts by mass | 6 | 6 | 6 | 6 | 6 | 6 | 6 |
| The mixing ratio of the aluminum hydroxide relative to 100 parts by mass of resin component | | | Parts by mass | 200 | 240 | 160 | 160 | 160 | 160 | 200 |
| The mixing ratio of the saturated polyester relative to 100 parts by mass of resin component | | | Parts by mass | 12 | 12 | 6 | 18 | 12 | 12 | 12 |
| Volume content in molding material | Filler-excluding component | | vol % | 47.1 | 35.2 | 50.0 | 50.0 | 50.0 | 50.0 | 45.9 |
| | Aluminum hydroxide | | vol % | 32.5 | 31.1 | 29.8 | 29.8 | 29.8 | 29.8 | 33.8 |
| | Filler | Glass balloon | vol % | — | 13.6 | — | — | — | — | — |
| | | Calcium carbonate | vol % | — | — | — | — | — | — | — |
| | Reinforced fiber | | vol % | 20.4 | 20.1 | 20.2 | 20.2 | 20.2 | 20.2 | 20.3 |

TABLE 3

| Comparative Example No. | | | Unit | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|
| Resin component | Unsaturated polyester resin | Unsaturated polyester resin of Synthesis Example 1 | Parts by mass | 60 | 60 | — | 60 | 60 | 60 | 50 |
| | | Unsaturated polyester resin of Synthesis Example 2 | Parts by mass | — | — | 60 | — | — | — | — |
| | Polymenzable monomer | Styrene | Parts by mass | 5 | 5 | 5 | 10 | 5 | 15 | — |
| | Low profile agent | Polyvinyl acetate solution | Parts by mass | 15 | 15 | 15 | — | 15 | 5 | 30 |
| | | Saturated polyester resin of Synthesis Example 3 | Parts by mass | 20 | 20 | 20 | — | 20 | 20 | 20 |
| | | Polystyrene solution | Parts by mass | — | — | — | 20 | — | — | — |
| | | Polyethylene powder | Parts by mass | — | — | — | 10 | — | — | — |
| | Other thermosetting resin | Vinyl ester resin of Synthesis Example 4 | Parts by mass | — | — | — | — | — | — | — |
| | | Brominated vinyl ester resin of Synthesis Example 5 | Parts by mass | — | — | — | — | — | — | — |
| | Aluminum hydroxide | | Parts by mass | — | 350 | 160 | 160 | 130 | 160 | 160 |
| Polymerization inhibitor | p-Benzoquinone | | Parts by mass | 0.05 | 0.05 | 0.05 | 0.05 | 0.05 | 0.05 | 0.05 |
| Curing agent | Perbutyl I-75 | | Parts by mass | 1.0 | 1.0 | 1.0 | 1.0 | 1.0 | 1.0 | 1.0 |
| Release agent | Zinc Stearate | | Parts by mass | 5 | 5 | 5 | 5 | 5 | 5 | 5 |
| | BYK-P9060 | | Parts by mass | — | — | — | — | — | — | — |
| Coloring agent | Black polyester toner | | Parts by mass | 10 | 10 | 10 | 10 | 10 | 10 | 10 |
| Filler | Calcium carbonate | | Parts by mass | 180 | — | — | — | — | — | — |
| | Glass balloon | | Parts by mass | — | — | — | — | — | — | — |
| Viscosity reducing agent | BYK-W996 | | Parts by mass | 2 | 3 | 2 | 2 | 2 | 2 | 2 |
| Fire retardant | Phosphorus fire retardant | OP1230 | Parts by mass | — | — | — | — | — | — | — |
| | | AP422 | Parts by mass | — | — | — | — | — | — | — |
| | | Red phosphorus | Parts by mass | — | — | — | — | — | — | — |
| | Bromine fire retardant | BPBPE (Bis penta bromo phenyl ethane) | Parts by mass | — | — | — | — | — | — | — |
| | Antimony oxide | Diantimony trioxide | Parts by mass | — | — | — | — | — | — | — |

TABLE 3-continued

| Comparative Example No. | | Unit | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|
| Thickening agent | Magnesium oxide | Parts by mass | 0.8 | 0.8 | 0.8 | 0.8 | 0.8 | 0.8 | 0.8 |
| Reinforced fiber | Glass fiber (fiber length (25 mm)) | % | 28 | 26 | 29 | 29 | 30 | 28 | 28 |
| | Carbon fiber (fiber length (25 mm)) | % | — | — | — | — | — | — | — |
| Mixing ratio of the unsaturated polybasic acid relative to 100 mol % of polybasic acid | | mol % | 100 | 100 | 67 | 100 | 100 | 100 | 100 |
| The mixing ratio of the polyvinyl acetate relative to 100 parts by mass of resin component | | Parts by mass | 6 | 6 | 6 | — | 6 | 2 | 12 |
| The mixing ratio of the aluminum hydroxide relative to 100 parts by mass of resin component | | Parts by mass | — | 350 | 160 | 160 | 130 | 160 | 160 |
| The mixing ratio of the saturated polyester relative to 100 parts by mass of resin component | | Parts by mass | 12 | 12 | 12 | — | 12 | 12 | 12 |
| Volume content in molding material | Filler-excluding component | vol % | 49.8 | 34.8 | 50.0 | 50.0 | 53.7 | 50.0 | 50.0 |
| | Aluminum hydroxide | vol % | — | 45.0 | 29.8 | 29.8 | 26.0 | 29.8 | 29.8 |
| | Filler — Glass balloon | vol % | — | — | — | — | — | — | — |
| | Calcium carbonate | vol % | 29.7 | — | — | — | — | — | — |
| | Reinforced fiber | vol % | 20.5 | 20.2 | 20.2 | 20.2 | 20.3 | 20.2 | 20.2 |

TABLE 4

| Comparative Example No. | | | Unit | Example 1 | Example 2 | Example 3 | Eample 4 | Eample 5 | Eample 6 | Eample 7 | Eample 8 |
|---|---|---|---|---|---|---|---|---|---|---|---|
| Evaluation | Molding compression rate | Compression rate | % | −0.02 | −0.05 | −0.04 | −0.04 | −0.04 | −0.03 | −0.02 | −0.02 |
| | | Evaluation | — | Good | Good | Good | Good | Good | Good | Good | Good |
| | Flame retardancy | Evaluation | — | Excellent | Good | Good | Excellent | Excellent | Excellent | Excellent | Good |
| | | V-0 standard (thickness 4 mm) | — | Compatible | Compatible | Compatible | Compatible | Compatible | Compatible | Compatible | Compatible |
| | | V-0 standard (thickness 3 mm) | — | Compatible | Compatible | Compatible | Compatible | Compatible | Compatible | Compatible | Compatible |
| | | 5 VA standard (thickness 3 mm) | — | Compatible | Not compatible | Not compatible | Compatible | Compatible | Compatible | Compatible | Not compatible |
| | Linear expansion coefficient | Linear expansion coefficient | ppm/° C. | 17.1 | 17.5 | 19.6 | 20.1 | 18.5 | 18.2 | 18.5 | 18.4 |
| | | Difference of linear expansion coefficient of aluminum | — | 5.9 | 5.5 | 3.4 | 2.9 | 4.5 | 4.8 | 4.5 | 4.6 |
| | | Evaluation | — | Good | Good | Excellent | Excellent | Good | Good | Good | Good |
| | Smoke production | | — | Good | Good | Good | Good | Bad | Good | Good | Good |
| | Production stability | Impregnated state/film release | — | Good/Good | Good/Good | Good/Good | Good/Good | Good/Good | Good/Good | Good/Good | Good/Good |
| | Density | | g/mL | 1.89 | 1.73 | 1.77 | 1.67 | 1.86 | 1.72 | 1.81 | 1.84 |
| | Flexural properties (23° C.) | Flexural modulus | GPa | 12.0 | 15.0 | 12.1 | 12.1 | 12.2 | 12.0 | 12.1 | 12.2 |
| | | Bending strength | MPa | 222 | 225 | 218 | 219 | 222 | 221 | 219 | 219 |
| | | Specific rigidity | (MPa)$^{1/3}$/(g/mL) | 12.1 | 14.3 | 12.9 | 13.7 | 12.4 | 13.3 | 12.7 | 12.5 |
| | Flexural properties (90° C.) | Flexural modulus | GPa | 9.2 | 12.4 | 9.1 | 9.2 | 9.2 | 9.2 | 9.2 | 9.2 |
| | | Bending strength | MPa | 142 | 145 | 139 | 140 | 137 | 140 | 139 | 139 |
| | | Specific rigidity | (MPa)$^{1/3}$/(g/mL) | 11.1 | 13.4 | 11.8 | 12.5 | 11.3 | 12.2 | 11.6 | 11.4 |
| | Tensile properties | Tensile modulus | GPa | 12.5 | 15.6 | 12.5 | 12.5 | 12.5 | 12.5 | 12.5 | 12.4 |
| | | Tensile strength | MPa | 110 | 113 | 108 | 107 | 110 | 108 | 112 | 112 |

TABLE 5

| Comparative Example No. | | | Unit | Example 9 | Example 10 | Example 11 | Eample 12 | Eample 13 | Eample 14 | Eample 15 |
|---|---|---|---|---|---|---|---|---|---|---|
| Evaluation | Molding compression rate | Compression rate | % | −0.02 | −0.04 | 0.01 | −0.05 | −0.04 | −0.04 | −0.04 |
| | | Evaluation | — | Good | Good | Fair | Good | Good | Good | Good |
| | Flame retardancy | Evaluation | — | Good | Excellent | Good | Fair | Good | Good | Excellent |
| | | V-0 standard (thickness 4 mm) | — | Compatible | Compatible | Compatible | Compatible | Compatible | Compatible | Compatible |
| | | V-0 standard (thickness 3 mm) | — | Compatible | Compatible | Compatible | Not compatible | Compatible | Compatible | Compatible |
| | | 5 VA standard (thickness 3 mm) | — | Not compatible | Compatible | Not compatible | Not compatible | Not compatible | Not compatible | Compatible |

TABLE 5-continued

| Comparative Example No. | | Unit | Example 9 | Example 10 | Example 11 | Eample 12 | Eample 13 | Eample 14 | Eample 15 |
|---|---|---|---|---|---|---|---|---|---|
| Linear expansion coefficient | Linear expansion coefficient | ppm/° C. | 18.4 | 18.2 | 19.7 | 19.5 | 19.6 | 19.6 | 19.6 |
| | Difference of linear expansion coefficient of aluminum | — | 4.6 | 4.8 | 3.3 | 3.5 | 3.4 | 3.4 | 3.4 |
| | Evaluation | — | Good | Good | Excellent | Excellent | Excellent | Excellent | Excellent |
| Smoke production | | — | Good | Good | Good | Good | Good | Good | Good |
| Production stability | Impregnated state/film release | — | Good/Good | Bad/Good | Good/Good | Good/Good | Good/Good | Good/Good | Good/Good |
| | Density | g/mL | 1.85 | 1.70 | 1.77 | 1.77 | 1.77 | 1.77 | 1.84 |
| Flexural properties (23° C.) | Flexural modulus | GPa | 12.0 | 12.0 | 12.0 | 12.0 | 12.0 | 13.0 | 13.0 |
| | Bending strength | MPa | 213 | 222 | 217 | 219 | 219 | 230 | 237 |
| | Specific rigidity | (MPa)$^{1/3}$/(g/mL) | 12.4 | 13.4 | 12.9 | 12.9 | 12.9 | 13.3 | 12.8 |
| Flexural properties (90° C.) | Flexural modulus | GPa | 9.2 | 9.0 | 8.8 | 7.0 | 9.1 | 9.6 | 9.8 |
| | Bending strength | MPa | 139 | 138 | 136 | 128 | 138 | 145 | 149 |
| | Specific rigidity | (MPa)$^{1/3}$/(g/mL) | 11.3 | 12.2 | 11.7 | 10.8 | 11.8 | 12.0 | 11.6 |
| Tensile properties | Tensile modulus | GPa | 12.3 | 12.5 | 12.6 | 12.8 | 12.4 | 13.0 | 13.4 |
| | Tensile strength | MPa | 111 | 110 | 108 | 112 | 109 | 114 | 118 |

TABLE 6

| Comparative Example No. | | | Unit | Comp. Example 1 | Comp. Example 2 | Comp. Example 3 | Comp. Eample 4 | Comp. Eample 5 | Comp. Eample 6 | Comp. Eample 7 |
|---|---|---|---|---|---|---|---|---|---|---|
| Evaluation | Molding compression rate | Compression rate | % | −0.03 | −0.03 | 0.10 | 0.18 | −0.04 | 0.12 | −0.05 |
| | | Evaluation | — | Good | Good | Bad | Bad | Good | Bad | Good |
| | Flame retardancy | Evaluation | — | Bad | Excellent | Fair | Fair | Bad | Good | Good |
| | | V-0 standard (thickness 4 mm) | — | Not compatible | Compatible | Compatible | Compatible | Not compatible | Compatible | Compatible |
| | | V-0 standard (thickness 3 mm) | — | Not compatible | Compatible | Not compatible | Not compatible | Not compatible | Compatible | Compatible |
| | | 5 VA standard (thickness 3 mm) | — | Not compatible | Compatible | Not compatible | Not compatible | Not compatible | Not compatible | Not compatible |
| | Linear expansion coefficient | Linear expansion coefficient | ppm/° C. | 15.0 | 14.2 | 19.9 | 19.3 | 20.3 | 19.5 | 19.4 |
| | | Difference of linear expansion coefficient of aluminum | — | 8.0 | 8.8 | 3.1 | 3.7 | 2.7 | 3.5 | 3.6 |
| | | Evaluation | — | Bad | Bad | Excellent | Excellent | Excellent | Excellent | Excellent |
| | Smoke production | | — | Good | Good | Good | Good | Good | Good | Good |
| | Production stability | Impregnated state/film release | — | Good/Good | Bad/Good | Good/Good | Good/Good | Good/Good | Good/Good | Good/Bad |
| | | Density | g/mL | 1.86 | 2.01 | 1.77 | 1.77 | 1.73 | 1.77 | 1.77 |
| | Flexural properties (23° C.) | Flexural modulus | GPa | 11.5 | 12.1 | 12.1 | 12.2 | 11.9 | 12.0 | 11.8 |
| | | Bending strength | MPa | 180 | 217 | 219 | 218 | 218 | 222 | 215 |
| | | Specific rigidity | (MPa)$^{1/3}$/(g/mL) | 12.1 | 11.4 | 13.0 | 13.0 | 13.2 | 13.0 | 12.9 |
| | Flexural properties (90° C.) | Flexural modulus | GPa | 9.1 | 9.0 | 9.1 | 9.0 | 8.9 | 8.8 | 6.8 |
| | | Bending strength | MPa | 139 | 138 | 139 | 139 | 140 | 136 | 123 |
| | | Specific rigidity | (MPa)$^{1/3}$/(g/mL) | 11.2 | 10.3 | 11.8 | 11.8 | 12.0 | 11.7 | 10.7 |
| | Tensile properties | Tensile modulus | GPa | 12.0 | 12.2 | 12.5 | 12.5 | 12.3 | 12.5 | 12.7 |
| | | Tensile strength | MPa | 70 | 110 | 110 | 110 | 108 | 107 | 110 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The unsaturated polyester resin composition, molding material, and molded article of the present invention can be suitably used for a battery pack housing for electric vehicles. The battery pack housing for electric vehicles of the present invention can be suitably used for vehicles requiring flame retardancy.

DESCRIPTION OF REFERENCE NUMERALS 1 battery pack housing for electric vehicles
2 tray member
3 cover member

The invention claimed is:

1. An unsaturated polyester resin composition comprising:
   a resin component containing an unsaturated polyester resin consisting of an unsaturated polyester and a polymerizable monomer, and a low profile agent; and aluminum hydroxide,
   wherein the unsaturated polyester is a polymerized product of only polybasic acid and polyhydric alcohol,
   the polymerizable monomer is not an alcohol,
   the polybasic acid contains unsaturated polybasic acid,
   the unsaturated polybasic acid is blended in an amount of 80 mol % or more relative to 100 mol % of the polybasic acid,
   the low profile agent contains polyvinyl acetate,
   the polyvinyl acetate is blended in an amount of 3 parts by mass or more and 10 parts by mass or less relative to 100 parts by mass of the resin component,
   the aluminum hydroxide is blended in an amount of 150 parts by mass or more and 300 parts by mass or less relative to 100 parts by mass of the resin component, and
   the polyhydric alcohol consists of one or more alkane diols.

2. The unsaturated polyester resin composition according to claim 1, wherein
   the low profile agent further contains a saturated polyester, and
   the saturated polyester is blended in an amount of 8 parts by mass or more and 15 parts by mass or less relative to 100 parts by mass of the resin component.

3. The unsaturated polyester resin composition according to claim 1,
   substantially containing no halogen fire retardant.

4. The unsaturated polyester resin composition according to claim 1,
   further containing a phosphorus fire retardant.

5. The unsaturated polyester resin composition according to claim 1,
   further containing a hollow filler.

6. A molding material comprising:
   the unsaturated polyester resin composition according to claim 1 and reinforced fiber, wherein
   in the unsaturated polyester resin composition, a filler-excluding component is contained in total of 30 vol % or more and 50 vol % or less, the filler-excluding component being a component excluding the aluminum hydroxide and filler blended as necessary.

7. A molded article comprising
   the cured product of the molding material according to claim 6.

8. The molded article according to claim 7, having
   a linear expansion coefficient of more than 17 ppm/° C. and 25 ppm/° C. or less.

9. The molded article according to claim 7,
   for use as a battery pack housing for electric vehicles.

10. A battery pack housing for electric vehicles,
    containing an aluminum member, and the molded article according to claim 7 combined with the aluminum member.

* * * * *